(12) United States Patent
Gereg et al.

(10) Patent No.: US 11,364,650 B2
(45) Date of Patent: Jun. 21, 2022

(54) KNIFE REPLACEMENT TOOLS AND METHODS OF USING THE SAME TO REMOVE KNIVES FROM MACHINES

(71) Applicant: Urschel Laboratories, Inc., Chesterton, IN (US)

(72) Inventors: Dustin Joseph Gereg, Lowell, IN (US); Scott Alan Klockow, Kouts, IN (US)

(73) Assignee: Urschel Laboratories, Inc., Chesterton, IN (US)

( * ) Notice: Subject to any disclaimer, the term of this patent is extended or adjusted under 35 U.S.C. 154(b) by 0 days.

(21) Appl. No.: 17/382,468

(22) Filed: Jul. 22, 2021

(65) Prior Publication Data

US 2021/0347084 A1   Nov. 11, 2021

Related U.S. Application Data

(62) Division of application No. 16/796,535, filed on Feb. 20, 2020, now Pat. No. 11,117,285.

(60) Provisional application No. 62/807,838, filed on Feb. 20, 2019.

(51) Int. Cl.
*B23P 6/00*   (2006.01)
*B26D 7/26*   (2006.01)
*B23Q 3/154*  (2006.01)

(52) U.S. Cl.
CPC .............. *B26D 7/2614* (2013.01); *B23P 6/00* (2013.01); *B23Q 3/1546* (2013.01)

(58) Field of Classification Search
CPC ....... B26D 7/2614; B26D 7/0691; B23P 6/00; B23Q 3/1546; B21D 1/00; B21D 3/00; B22D 19/10
See application file for complete search history.

(56) References Cited

U.S. PATENT DOCUMENTS

| 10,807,268 | B2* | 10/2020 | Gereg | ................. B26D 7/0691 |
| 10,843,363 | B2* | 11/2020 | Gereg | ..................... B26D 1/03 |
| 2012/0272540 | A1* | 11/2012 | Ornelaz, Jr. | ....... B23Q 17/0919 73/1.79 |
| 2018/0126581 | A1* | 5/2018 | Jacko | ................... B26D 7/2614 |
| 2018/0333886 | A1* | 11/2018 | Gereg | ................. B26D 1/0006 |
| 2019/0143554 | A1* | 5/2019 | Gereg | ..................... B26D 1/03 83/403 |
| 2019/0329437 | A1* | 10/2019 | Gereg | ................. B26D 7/2614 |

* cited by examiner

*Primary Examiner* — Lawrence Averick
(74) *Attorney, Agent, or Firm* — Hartman Global IP Law; Gary M. Hartman; Domenica N. S. Hartman (57) ABSTRACT

Tools for replacing knives in cutting machines. The tools include a clamping body having a base, bracket, clamp, and knife support tab(s). The bracket has a flange portion spaced apart from an upper surface of the base. The clamp is coupled to the base for translating in translation directions transverse to a longitudinal axis of the base. The clamp has a lift tab on the same side of the base as a rear surface thereof, and a handle is secured to the flange portion of the bracket and located on the same side of the base as the lift tab. The support tab projects from the front surface of the base, and the clamp is biased toward the support tab so that the clamp and support tab create a knife gripping mechanism for clamping an edge of a knife against the tab.

5 Claims, 14 Drawing Sheets

KNIFE REPLACEMENT TOOLS AND METHODS OF USING THE SAME TO REMOVE KNIVES FROM MACHINES

CROSS-REFERENCE TO RELATED APPLICATIONS

This is a division patent application of co-pending U.S. patent application Ser. No. 16/796,535, filed Feb. 20, 2020, which claims the benefit of U.S. Provisional Application No. 62/807,838 filed Feb. 20, 2019. The contents of these prior applications are incorporated herein by reference.

BACKGROUND OF THE INVENTION

The present invention generally relates to machines for cutting products, including but not limited to slicing food products, and to tools used to adjust or maintain the operation of such machines. The invention particularly relates to tools for replacing knives in slicing machines.

Various types of equipment are known for slicing, shredding and granulating food products, as nonlimiting examples, vegetables, fruits, dairy products, and meat products. Widely used machines for this purpose are commercially available from Urschel Laboratories, Inc., and include machines under the names Model CC® and Model CCL. The Model CC® and CCL machines are centrifugal-type slicers capable of slicing a wide variety of products at high production capacities. The Model CC® line of machines is particularly adapted to produce uniform slices, strip cuts, shreds and granulations, and the Model CCL line is particularly adapted to produce slices or chips of a waffle or lattice type. Certain configurations and aspects of Model CC® machines are represented in U.S. Pat. Nos. 3,139,128, 3,139,129, 5,694,824, 6,968,765, 7,658,133, 8,161,856, and 9,193,086, 9,193,086, and 10,456,943 and U.S. Patent Application Publication No. 2016/0361831, the entire contents of which are incorporated herein by reference.

Figure 1:
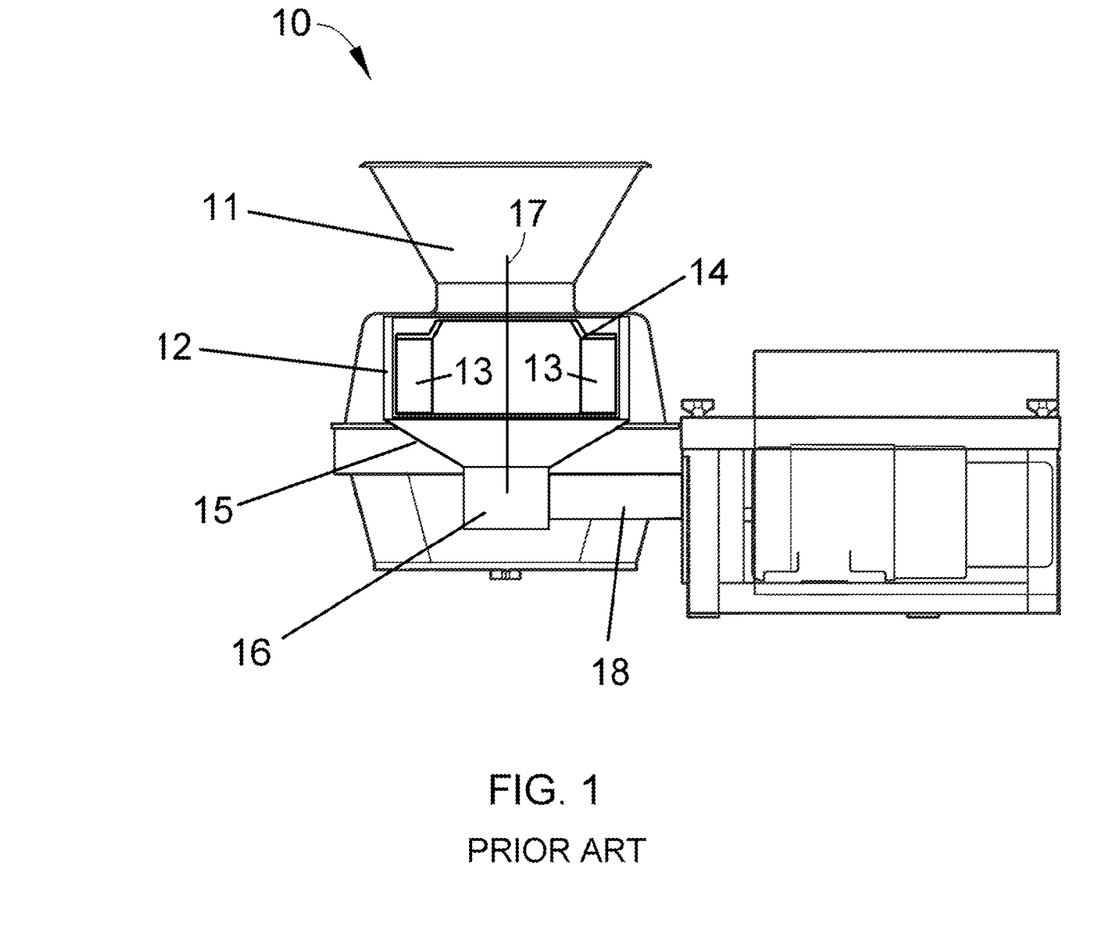
FIG. 1 schematically represents a side view in partial cross-section of a centrifugal-type slicing machine known in the art.

FIG. 1 schematically depicts a machine 10 representative of a Model CC® machine. The machine 10 includes a generally annular-shaped cutting head 12 equipped with cutting knives (not shown) mounted along its circumference. An impeller 14 is coaxially mounted within the cutting head 12 and has an axis 17 of rotation that coincides with the center axis of the cutting head 12. The impeller 14 is rotationally driven about its axis 17 through a shaft that is enclosed within a housing 18 and coupled to a gear box 16. The cutting head 12 is mounted on a support ring 15 above the gear box 16 and remains stationary as the impeller 14 rotates. Products are delivered to the cutting head 12 and impeller 14 through a feed hopper 11 located above the impeller 14. In operation, as the hopper 11 delivers products to the impeller 14, centrifugal forces cause the products to move outward into engagement with the knives of the cutting head 12. The impeller 14 comprises generally radially-oriented paddles 13, each having a face that engages and directs the products radially outward toward and against the knives of the cutting head 12 as the impeller 14 rotates. Other aspects pertaining to the construction and operation of Model CC® machines, including various embodiments thereof, can be appreciated from the aforementioned prior patent documents incorporated herein by reference.

Figure 2:
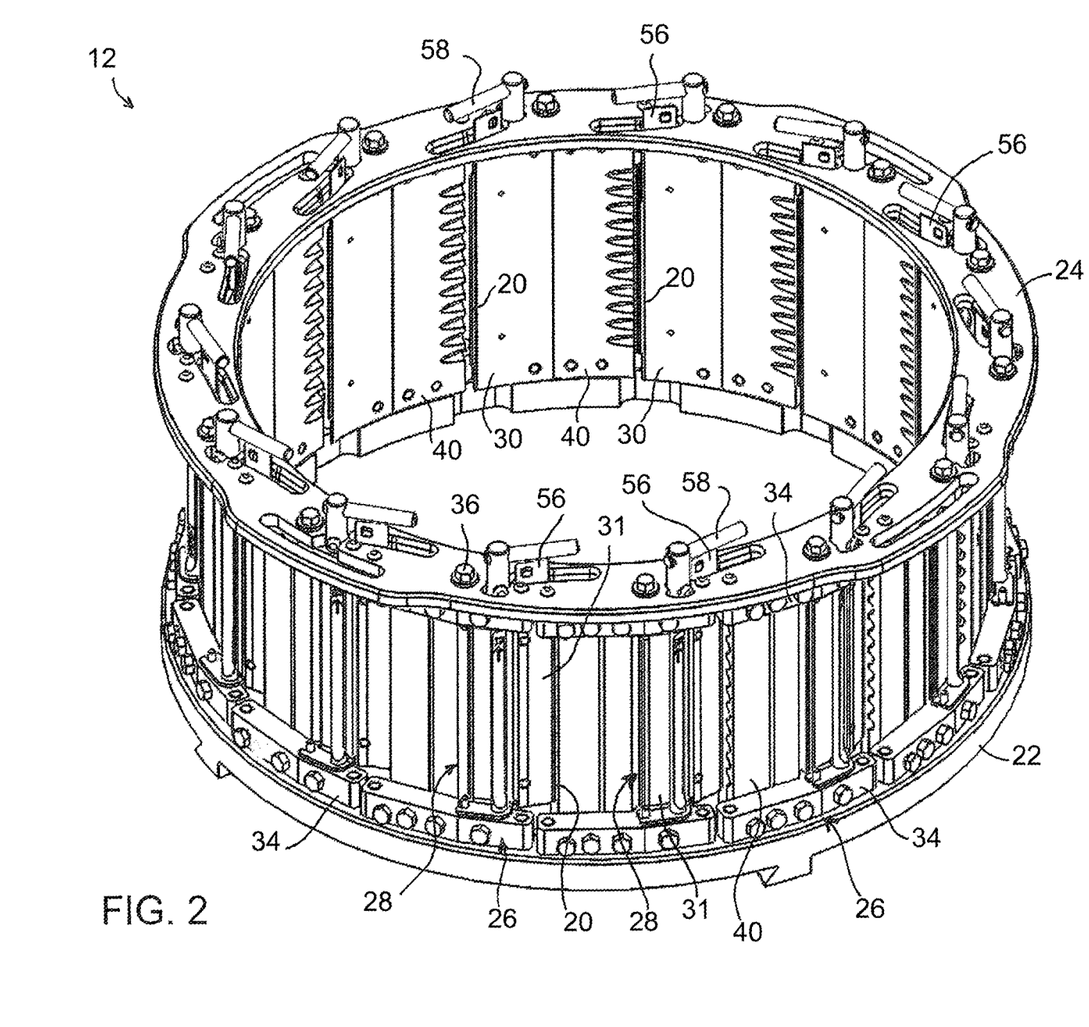
FIG. 2 is a perspective view representing a nonlimiting example of a cutting head capable for use with the slicing machine of FIG. 1.
Figure 3:
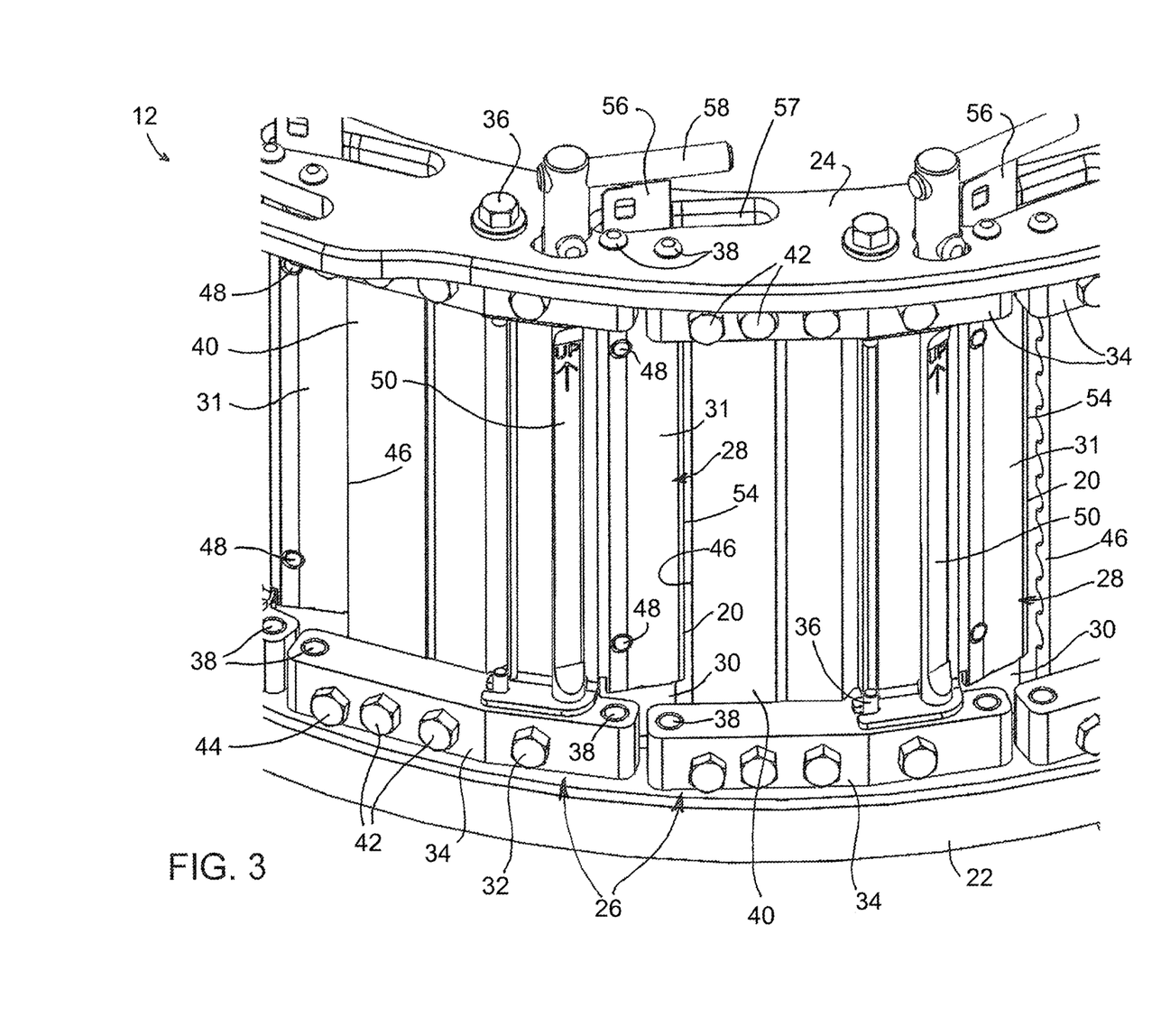
FIG. 3 is a detailed view showing a fragment of the cutting head of FIG. 3.

FIGS. 2 and 3 contain isolated views of an embodiment of a cutting head 12 that is capable of use with a variety of cutting machines, including the Model CC® slicing machine 10 depicted in FIG. 1. The cutting head 12 represented in FIGS. 2 and 3 will be described hereinafter in reference to the slicing machine 10 of FIG. 1 equipped with an impeller 14 as described in reference to FIG. 1. On the basis of the coaxial arrangement of the cutting head 12 and the impeller 14, relative terms including but not limited to "axial," "circumferential," "radial," etc., and related forms thereof may be used below to describe the cutting head 12 represented in FIGS. 2 and 3.

In the isolated view of FIG. 2, the cutting head 12 can be seen to be generally annular-shaped with cutting knives 20 mounted at its perimeter. FIGS. 2 and 3 represent the knives 20 as having straight cutting edges 54 for producing flat slices, and as such may be referred to herein as "flat" knives, though the cutting head 12 can use knives of other shapes, for example, "corrugated" knives characterized by a periodic pattern, such as a sinusoidal shape with peaks and valleys when viewed edgewise, to produce corrugated, strip-cut, shredded and granulated products. Each knife 20 projects radially inward in a direction generally opposite the direction of rotation of the impeller 14 within the cutting head 12, and defines a cutting edge 54 at its radially innermost extremity. The cutting head 12 further comprises lower and upper support rings 22 and ring 24 to and between which circumferentially-spaced slicing units 26 are mounted, each defining a cutting station of the cutting head 12. The knives 20 of the cutting head 12 are individually secured with clamping assemblies 28 to the slicing units 26. In the particular configuration shown in FIG. 2, each knife 20 has a handle 56 at its upper longitudinal end that protrudes through an opening 57 in the upper support ring 24. The knife handles 56 provide a safety advantage by serving as a portion of each knife 20 that can be directly touched by a user and is remote from the cutting edge 54 of the knife 20 during its installation and removal from the cutting head 12.

As more readily evident in FIG. 3, the clamping assembly 28 of each slicing unit 26 includes a knife holder 30 mounted with fasteners 32 to and between a pair of mounting blocks 34, which in turn are configured to be secured to the support rings 22 and 24 with fasteners 36 that rigidly secure the mounting blocks 34 to the rings 22 and 24. Each clamping assembly 28 further includes a clamp 31 positioned on the radially outward-facing side of the holder 30 to secure a knife 20 thereto. As shown in FIG. 3, the knife 20 is supported by a radially outer surface of the knife holder 30, and the clamp 31 overlies the holder 30 so that the knife 20 is between the surface of the holder 30 and a radially inward surface of the clamp 31 that faces the holder 30. Alignment of the knife 20, holder 30, and clamp 31 is achieved with pins 48 that protrude from the knife holder 30 into complementary slots and holes in, respectively, the knife 20 and clamp 31. By forcing the clamp 31 toward the holder 30, the clamp 31 will apply a clamping force to the knife 20 adjacent its cutting edge 54.

FIGS. 2 and 3 further show each slicing unit 26 as comprising an adjustable gate 40 secured to the mounting blocks 34 with fasteners 42. A food product crosses the gate 40 prior to encountering the knife 20 mounted to the succeeding slicing unit 26, and together the cutting edge 54 of a knife 20 and a preceding trailing edge 46 of the preceding gate 40 define a gate opening that determines the thickness of a slice produced by the knife 20. To provide relatively fine control of the thickness of a sliced product, the mounting blocks 34 are equipped with adjustment screws 44 that engage the gates 40 to alter the radial location of their trailing edges 46 relative to the cutting edge 54 of the succeeding knife 20.

As shown in FIG. 3, an eccentric cam rod 50 can be used as a quick-clamping feature to apply the clamping force to the clamp 31. The cam rod 50 is represented as passing through holes in the mounting blocks 34 to loosely assemble the clamp 31 to the mounting blocks 34 in combination with the pivot axis of the clamp 31 created by the fasteners 36. Clockwise rotation of the cam rod 50 (as viewed in FIG. 3) using a handle 58 attached thereto causes the cam rod 50 to eccentrically move into engagement with the surface of the clamp 31, forcing the clamp 31 into engagement with the knife 20. The force applied to the clamp 31 by the cam rod 50 can be released by rotating the cam rod 50 counterclockwise. Once the clamping forced is released, a knife 20 can be removed from the cutting head 12 by grasping its handle 56 and withdrawing the knife 20 upward through the opening 57 in the upper support ring 24.

The clamp 31 is pivotably mounted to the mounting blocks 34, and in the embodiment shown the fasteners 36 that secure the mounting blocks 34 to the rings 22 and 24 extend through the blocks 34 to also serve as pivot pins for the clamp 31. The mounting blocks 34 are equipped with pins 38 that engage holes in the support rings 22 and 24. By appropriately locating the holes in the rings 22 and 24, the orientation of the mounting blocks 34, and consequently the knife 20, knife holder 30, and clamp 31 mounted thereto, can be used to alter the radial location of the cutting edge 54 of the knife 20 with respect to the axis of the cutting head 12, thereby providing relatively coarse control of the thickness of the sliced food product.

As disclosed in some of the aforementioned prior patent documents incorporated herein by reference, an alternative to the quick-clamping arrangement of FIGS. 2 and 3 is to employ bolts to secure the knives 20 and clamps 31 to their respective knife holders 30.

While centrifugal-type slicers of the type represented by the Model CC® have performed extremely well for their intended purpose, further improvements are continuously desired and sought, including improvements relating to the maintenance of the machines. A nonlimiting example is the replacement of the knives 20, whose cutting edges are vulnerable to damage, for example, from impacts with stones, sand, and other debris that often accompany food products such as potatoes.

BRIEF DESCRIPTION OF THE INVENTION

The present invention provides tools for replacing knives in cutting machines, including centrifugal-type slicing machines having a cutting head with multiple knife assemblies mounted thereto.

According to one aspect, a knife replacement tool includes a clamping body and handle. The clamping body includes a base, a bracket, a clamp, and at least one knife support tab. The base has a cross-section that defines a lower surface, an oppositely-disposed upper surface, a front surface, and an oppositely-disposed rear surface. The bracket has a flange portion adjacent and spaced apart from the upper surface of the base. The clamp is coupled to the base so as to be able to translate relative to the base in translation directions that are transverse to a longitudinal axis of the base. The clamp includes a lift tab disposed on the same side of the base as the rear surface, and the handle is secured to the flange portion of the bracket so that at least a portion of the handle is located on the same side of the base as the lift tab. The knife support tab projects from the front surface of the base in a direction transverse to the translation directions of the clamp. The clamp is biased toward the knife support tab so that the clamp and the knife support tab create a knife gripping mechanism by which the clamp is able to clamp an edge of a knife against the tab.

Further aspects of the invention include methods of using a knife replacement tool as described above to install and remove knives from a cutting unit of a machine.

Technical aspects of knife replacement tools as described above preferably include the ability to install and remove knives from a cutting machine without requiring the installer to directly touch the knives during the installation and removal operations, thus reducing the risk of injury during maintenance operations performed on the machine.

Other aspects and advantages of this invention will be appreciated from the following detailed description.

DETAILED DESCRIPTION OF THE INVENTION

FIGS. 4 through 17 depict knife replacement tools that are capable of use with a variety of cutting machines, including but not limited to the centrifugal-type slicing machine 10 depicted in FIG. 1. Nonlimiting embodiments of the invention will be illustrated and described hereinafter in reference to the slicing machine 10 of FIG. 1 equipped with an impeller 14 and annular-shaped cutting head 12 as described in reference to FIGS. 1 through 3, and as such the following discussion will focus primarily on certain aspects of the invention that will be described in reference to the slicing machine 10 and cutting head 12. However, it will be appreciated that the teachings of the invention are also generally applicable to other types of cutting machines.

To facilitate the description provided below of the knife replacement tools represented in the drawings, relative terms may be used in reference to the orientation of the machine 10 as represented in FIG. 1 and the cutting head 12 as represented in FIG. 2. On the basis of the coaxial arrangement of the cutting head 12 and impeller 14 of the machine 10 represented in FIG. 1, relative terms including but not limited to "axial," "circumferential," "radial," etc., and related forms thereof may also be used below to describe the nonlimiting embodiments represented in the drawings. All such relative terms are useful to describe the illustrated embodiments but should not be otherwise interpreted as limiting the scope of the invention.

Figure 4:
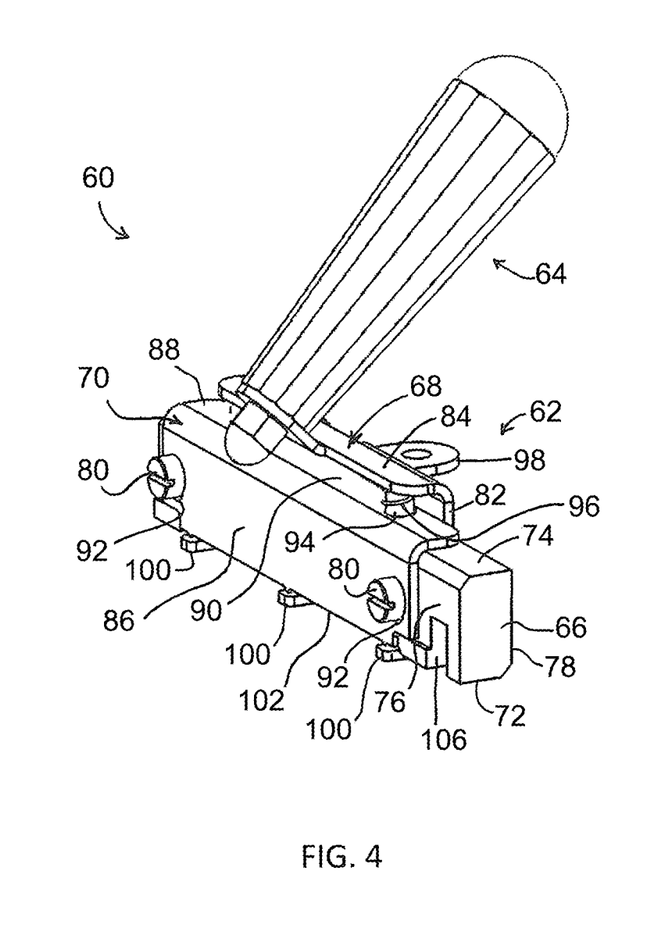
FIGS. 4 and 5 are perspective and perspective fragmentary views representing a knife replacement tool of a type capable of installing and removing knives from a cutting head of a slicing machine, as a nonlimiting example, a cutting head of the type represented in FIGS. 2 and 3, in accordance with a nonlimiting embodiment of the invention.
Figure 5:
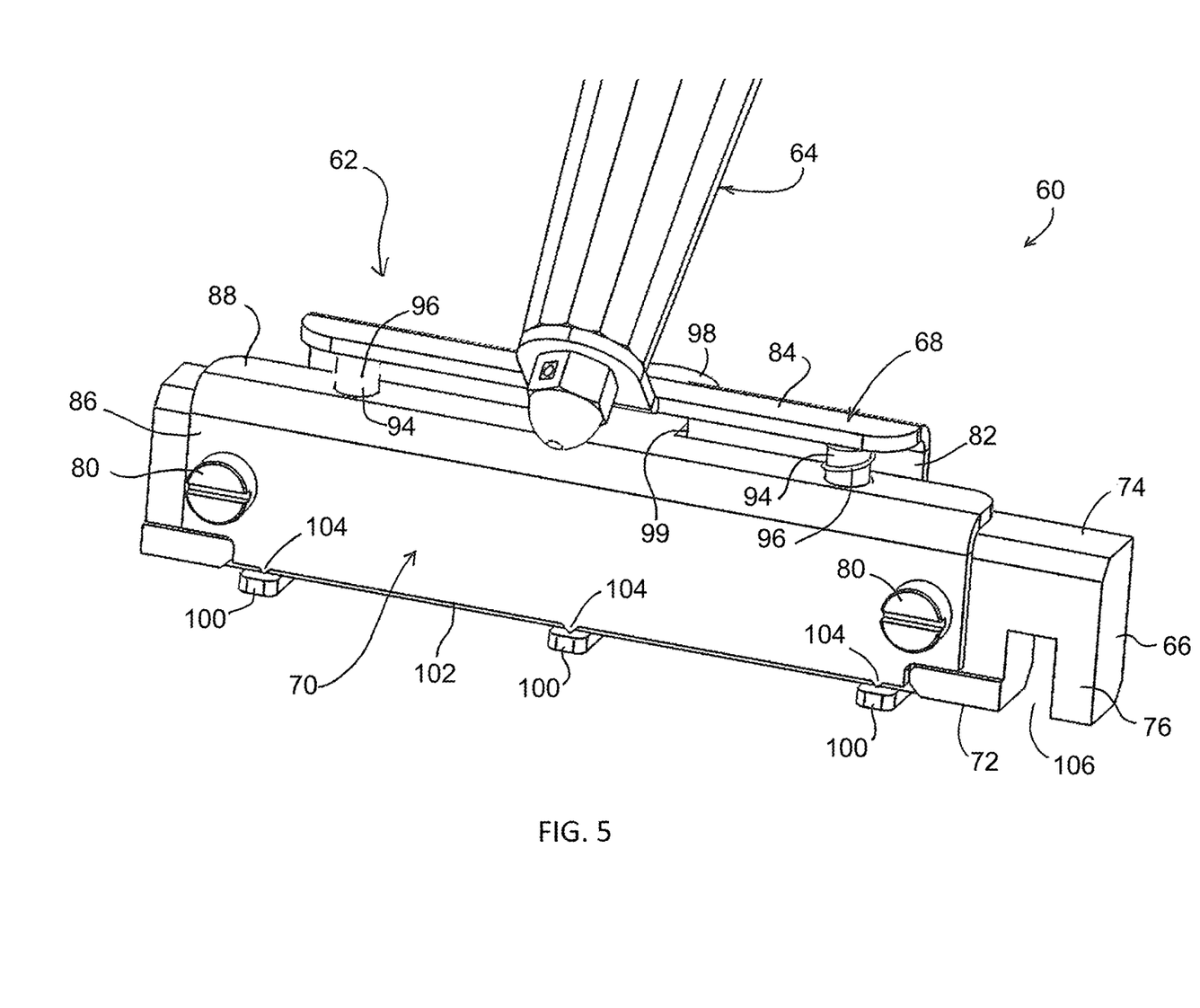
Figure 6:
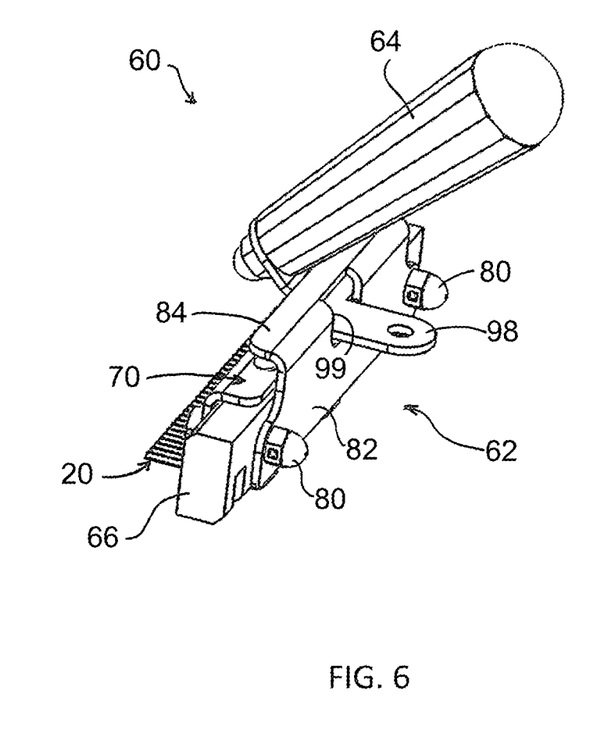
FIG. 6 is a perspective view representing the knife replacement tool of FIGS. 4 and 5 gripping a corrugated knife prior to installing the knife in or after removing the knife from a cutting head of a centrifugal-type slicing machine.
Figure 7:
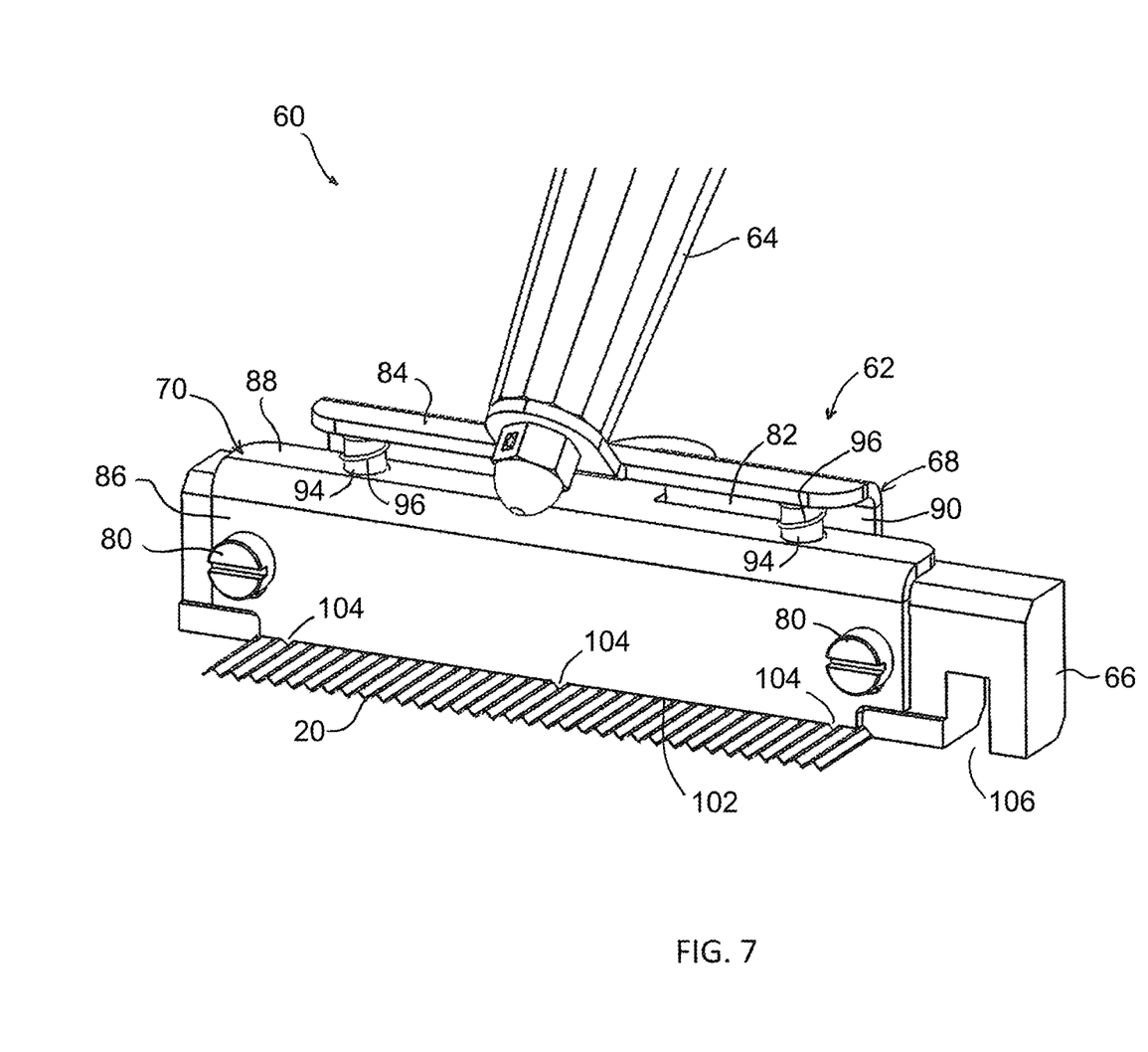
FIGS. 7 and 8 are perspective fragmentary views representing the knife replacement tool of FIG. 6 and the corrugated knife gripped thereby.
Figure 8:
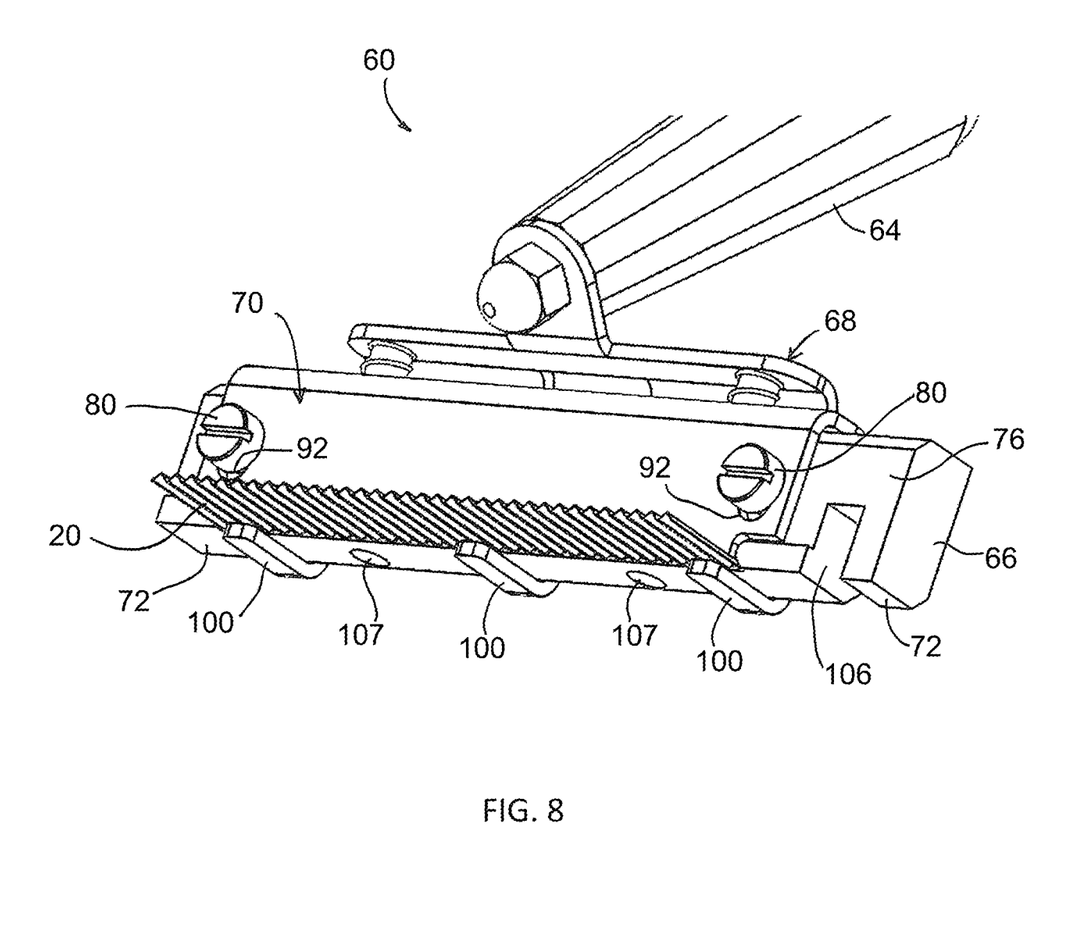

FIGS. 4 and 5 schematically represent a nonlimiting embodiment of a knife replacement tool 60 particularly well adapted for, but not limited to, installing and removing the knives 20 of the cutting head 12 of FIGS. 2 and 3. The tool 60 is represented in FIGS. 4 and 5 as comprising a clamping body 62 and handle 64. The clamping body 62 comprises a base 66 and a bracket 68 and clamp 70 secured to the base 66. The base 66 is represented as having a generally elongate shape with a rectangular cross-section that defines, as viewed in FIGS. 4 and 5, what are referred to herein as a lower surface 72, an oppositely-disposed upper surface 74, a front surface 76, and an oppositely-disposed rear surface 78. The bracket 68 is preferably secured to the base 66 so as to maintain a fixed position relative to the base 66, whereas the clamp 70 is secured to the base 66 so as to be able to translate relative to the base 66 in translation directions that are transverse to the longitudinal axis of the base 66. In the nonlimiting embodiment of FIGS. 4 and 5, the bracket 68 is secured to the base 66 with fasteners 80 that pass through the base 66 between its front and rear surfaces 76 and 78, with a lower flange portion 82 of the bracket 68 clamped against the rear surface 78 of the base 66 and an upper flange portion 84 of the bracket 68 adjacent and spaced apart from the upper surface 74 of the base 66. The handle 64 is secured to the upper flange portion 84 so that the majority of the handle 64 is located on the same side of the base 66 as its rear surface 78, and the handle 64 extends at an acute angle to the upper surface 74 of the base 66.

In the nonlimiting embodiment represented in FIGS. 4 and 5, the clamp 70 is mounted to the base 66 so as to be able to translate in directions parallel to the front surface 76 of the base 66 and perpendicular to the lower and upper surfaces 72 and 74 of the base 66. A lower flange portion 86 of the clamp 70 is secured to the base 66 with the fasteners 80 at the front surface 76, and an upper flange portion 88 of the clamp 70 is disposed within a gap 90 defined by and between the upper flange portion 84 of the bracket 68 and the upper surface 74 of the base 66. The fasteners 80 pass through elongate slots 92 in the lower flange portion 86 of the clamp 70 that are oriented to substantially limit the clamp 70 to translate in directions parallel to the front surface 76 of the base 66 and perpendicular to the lower and upper surfaces 72 and 74 of the base 66. A pair of pins or rods 94 span the gap 90 between the upper flange portion 84 of the bracket 68 and the upper surface 74 of the base 66, and compression coil springs 96 are mounted on the rods 94 and engage the upper flange portion 88 of the clamp 70 to bias the upper flange portion 88 downward toward the upper surface 74 of the base 66. Though compression coil springs 96 are depicted, various other biasing means are foreseeable, as nonlimiting examples, one or more springs (including gas or hydraulic) and/or elastic members that apply a compression, tension, or torsion force and may operate through a lever or other intermediate mechanism.

The clamp 70 includes a lift tab 98 that protrudes from its upper flange portion 88 through a slot 99 (FIGS. 5 and 6) in the bracket 68, such that the tab 98 is disposed on the same (rear) side of the base 66 as the handle 64. The tab 98 and handle 64 are positioned and oriented relative to each other so that an operator gripping the handle 64 with their hand can simultaneously grasp and draw the tab 98 toward the handle 64, causing the clamp 70 to translate upward so that its upper flange portion 88 translates away from the upper surface 74 of the base and toward the upper flange portion 84 of the bracket 68 against the biasing effect of the springs 96. Releasing the tab 98 allows the springs 94 to translate the clamp 70 downward so that its upper flange portion 88 translates away from the upper flange portion 84 of the bracket 68 and toward the upper surface 74 of the base 66.

The clamping body 62 is represented as comprising multiple knife support tabs 100 that project from the front surface 76 of the base 66 and the lower flange portion 86 of the clamp 70 in a direction transverse to the translating directions of the clamp 70. In the particular embodiment shown, the tabs 100 are generally parallel to the lower surface 72 of the base 66. In addition, the embodiment shown in the drawings represents the tabs 100 as formed as portions of the lower flange portion 82 of the bracket 68, such that the tabs 100 are adjacent and preferably abut the lower surface 72 of the base 66. The springs 96 bias the lower flange portion 86 of the clamp 70 downward toward the tabs 100 and optionally into contact with the tabs 100. In this manner, the lowermost edge 102 (FIGS. 4, 5, and 7) of the clamp 70 and the knife support tabs 100 create a knife gripping or clamping mechanism by which the lowermost edge 102 of the clamp 70 can clamp an edge of a knife against the tabs 100, as represented with the knife 20 in FIGS. 6, 7, and 8. The knife 20 depicted in FIGS. 6, 7, and 8 has a corrugated configuration, and the lowermost edge 102 of the clamp 70 is represented as having projections 104 that engage valleys of the corrugated knife 20 to assist in positioning and securing the knife 20 relative to the longitudinal direction of the base 66, as evident from FIG. 7.

Figure 9:
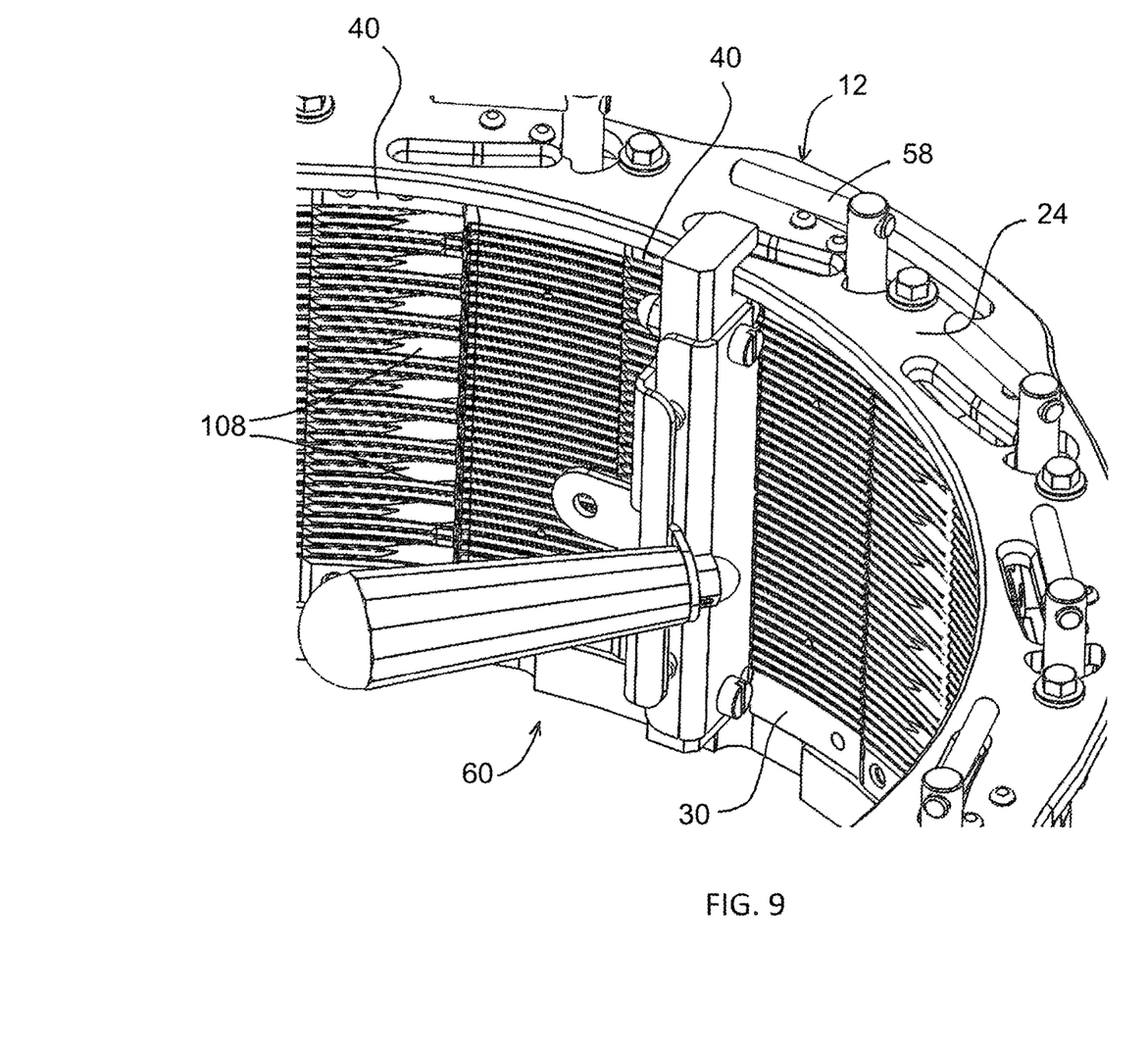
FIG. 9 is a perspective view of the knife replacement tool of FIGS. 4 through 8 in the process of installing a knife in a cutting head of a centrifugal-type slicing machine.
Figure 10:
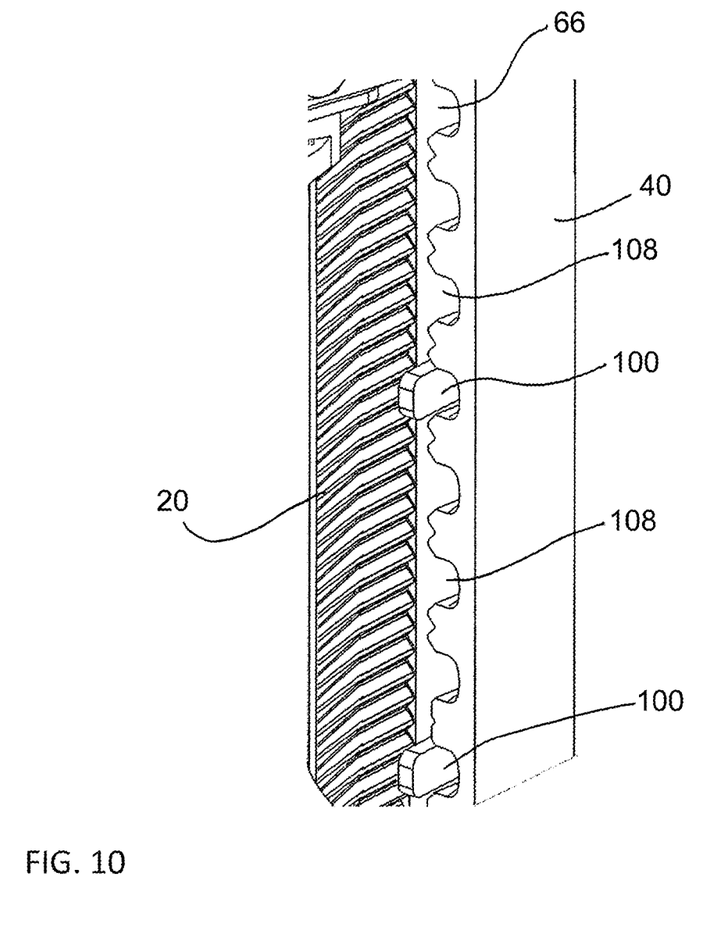
FIG. 10 is a detailed fragmentary perspective view of the knife replacement tool of FIG. 9.
Figure 11:
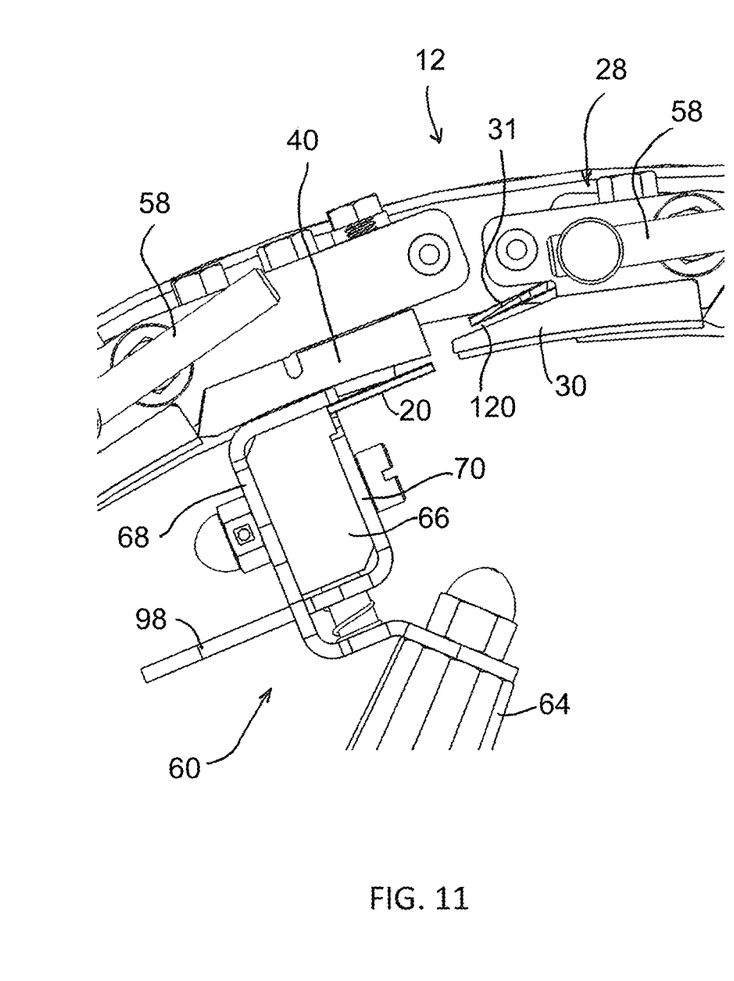
FIGS. 11 through 14 represent a progression of steps during the installation of the knife in the cutting head as portrayed in FIGS. 9 and 10.

FIG. 9 represents the tool 60 in position relative to a cutting head 12 to install or remove the knife 20 from a clamping assembly 28 of the cutting head 12. The clamping assembly 28 is represented as a "quick-clamping" assembly 28 of the type shown in FIGS. 2 and 3, though other clamping assembly configurations are foreseeable. To assist in positioning the tool 60 and maintaining its position relative to the cutting head 12, the tool 60 includes a slot 106 in the lower surface 72 of the base 66 that is sized to receive the upper ring 24 of the cutting head 12, and further includes magnets 107 (FIG. 8) embedded in the lower surface 72 of the base 66 to magnetically hold the base 66 against the radially interior surface of the cutting head 12, for example, against a gate 40 located adjacent the clamping assembly 28 that the knife 20 is being installed in or removed from. FIG. 10 shows that, for a cutting head 12 whose gates 40 are equipped with grooves 108 that promote egress of stones, sand, and other debris that often accompany food products such as potatoes (such as shown in FIG. 2), the knife support tabs 100 can be sized to be received in the grooves 108 to help locate the tool 60 relative to the cutting head 12.

Figure 12:
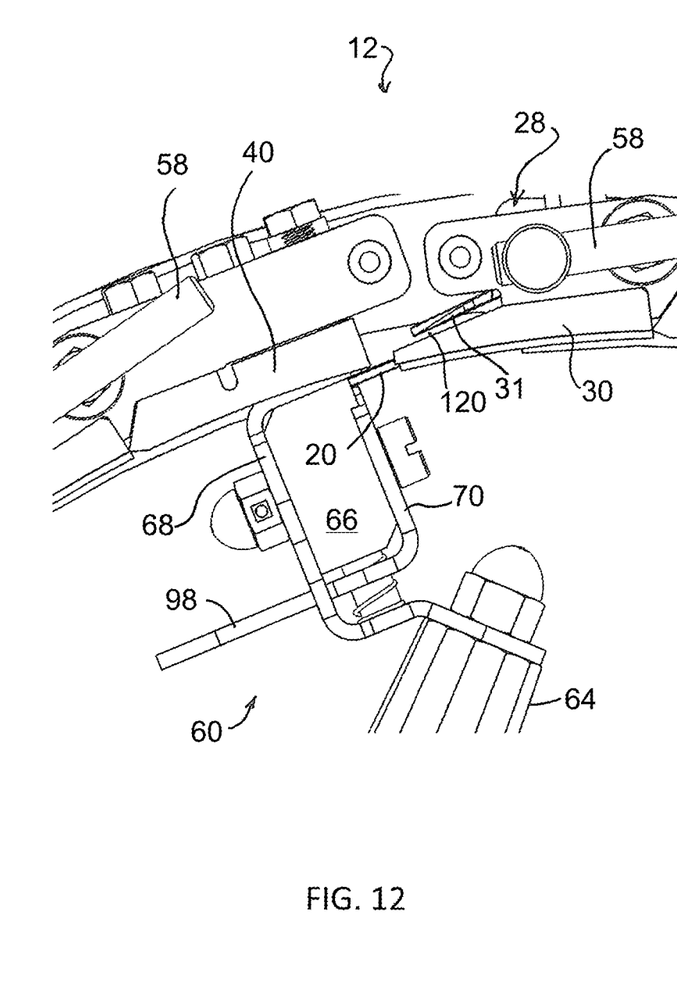
Figure 13:
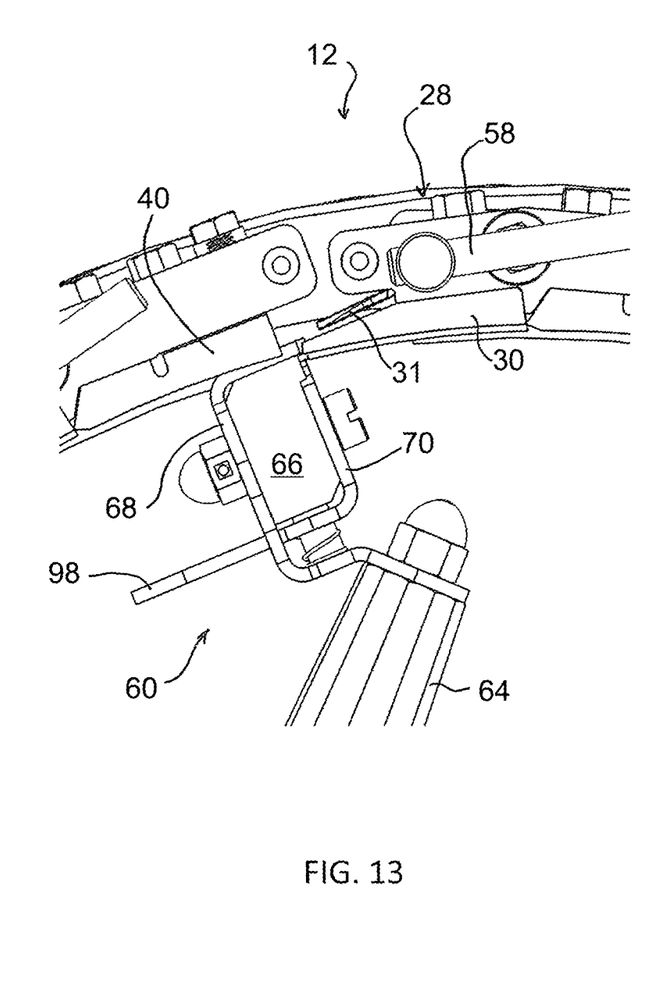
Figure 14:
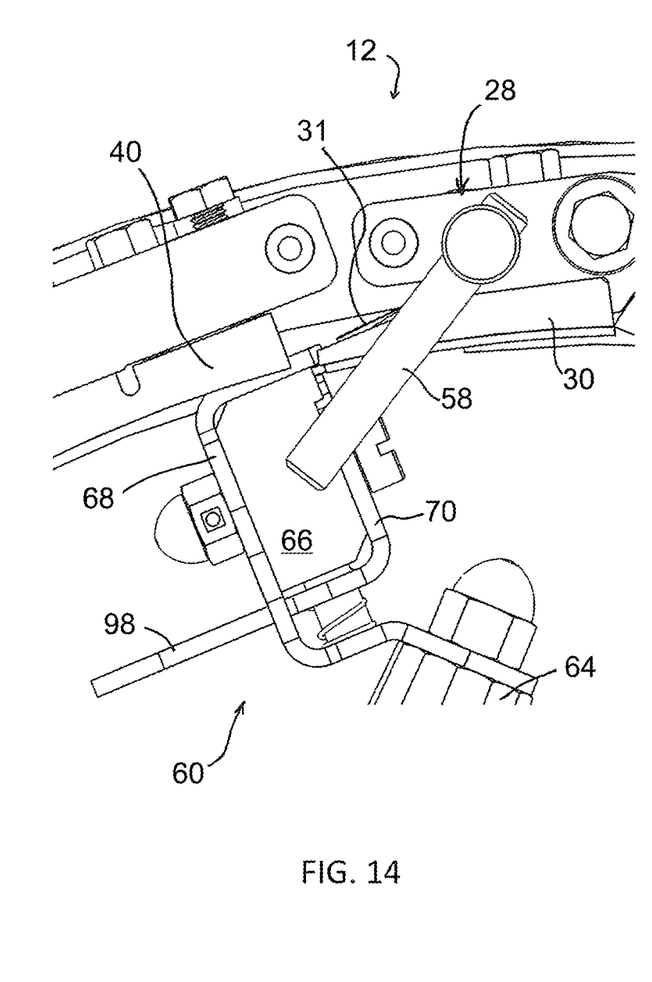

FIGS. 11 through 14 represent a progression of steps that occur during the installation of a knife 20 with the tool 60. In FIGS. 11 through 14, the upper support ring 24 is omitted to provide a clearer view of the operation of the tool 60. In FIG. 14, the handle 58 of the clamping assembly 28 has already been rotated to disengage the cam rod 50 from the clamp 31, releasing the clamping force that secures the clamp 31 against its knife holder 30 to permit installation of the knife 20 in a resulting gap 120 between the clamp 31 and knife holder 30. The clamping body 62 can be seen as abutting the gate 40 immediately adjacent the clamping assembly 28 in which the knife 20 held by the tool 60 is to be installed. As previously noted, the magnets 107 in the lower surface 72 of the base 66 can assist in maintaining the clamping body 62 of the tool 60 against the gate 40, and the knife support tabs 100 are received in the grooves 108 in the gate 40 to help locate the tool 60 relative to the cutting head 12. Additionally, the upper support ring 24 of the cutting head 12 (not shown in FIGS. 11 to 14) can be inserted in the slot 106 in the lower surface 72 of the base 66 to help locate the knife replacement tool 60 relative to the cutting unit 12, as evident from FIG. 9.

In FIG. 12, the tool 60 has been moved toward the knife holder 30 of the clamping assembly 28 and the knife 20 is partially received in the gap 120 between the clamp 31 and knife holder 30, and in FIG. 13 further movement of the tool 60 has resulted in the knife 20 being fully installed between the clamp 31 and knife holder 30. In FIG. 14, the handle 58 of the clamping assembly 28 has rotated the cam rod 50 (not visible) to cause the cam rod 50 to eccentrically move into engagement with the surface of the clamp 31, forcing the clamp 31 into engagement with the knife 20 to clamp the knife 20 between the clamp 31 and knife holder 30. Thereafter, the clamping tab 98 of the tool 60 can be released to disengage the clamp 70 from the knife 20, followed by withdrawing the tool 60 from the cutting head 12. Removal of the knife 20 can be achieved by simply reversing the order of the steps depicted in FIGS. 11 through 14.

Figure 15:
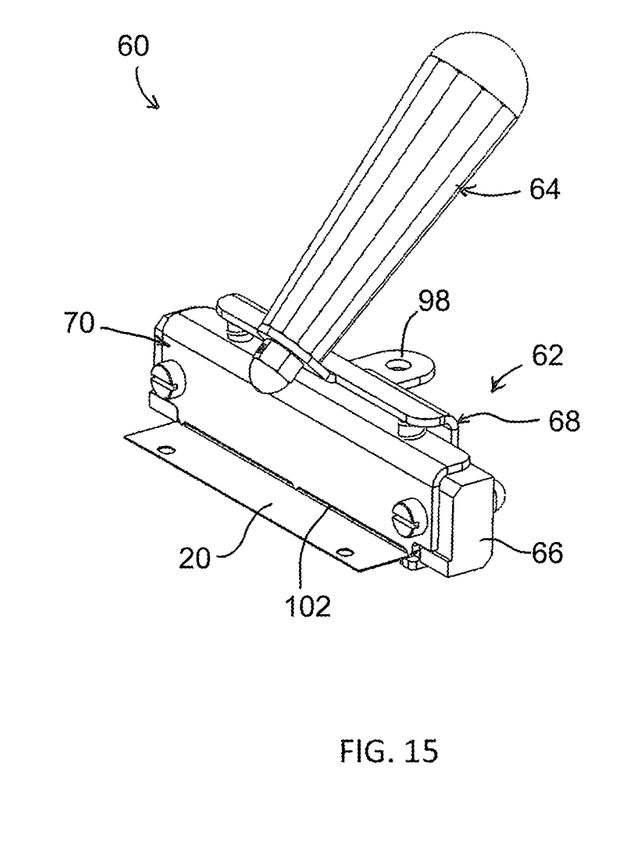
FIG. 15 is a perspective view representing the knife replacement tool of FIGS. 4 and 5 gripping a flat knife prior to installing the knife in or after removing the knife from a cutting head of a centrifugal-type slicing machine.

FIG. 15 represents that the knife replacement tool 60 is also capable of gripping a "flat" knife 20, i.e., having a straight cutting edge for producing flat slices. As such, the steps discussed above in reference to FIGS. 9 through 14 also apply to the installation and removal of flat knives. Notably, the tool 60 eliminates the need of a knife handle (for example, the handles 56 of the knives 20 shown in FIGS. 2 and 3), since the user is not required to directly touch the knives 20 during the actual installation and removal operations.

Figure 16:
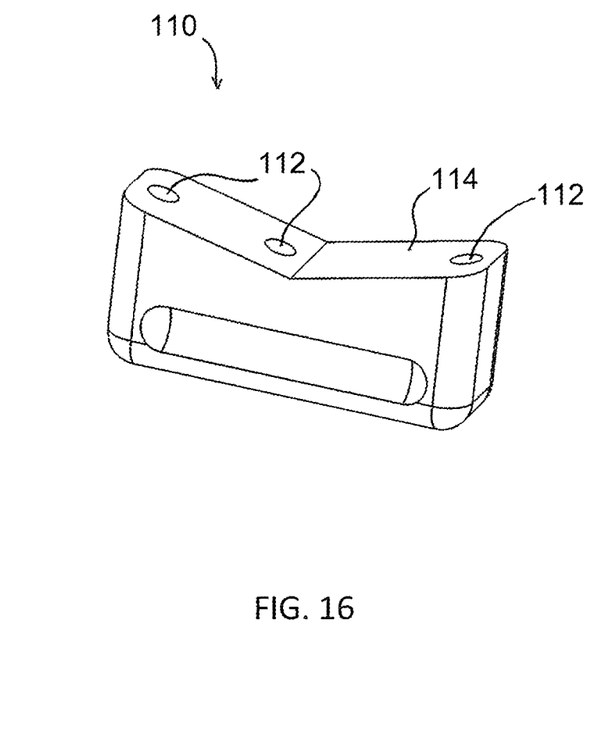
FIG. 16 represents an optional tool for assisting in the installation and removal of a knife from a cutting head.
Figure 17:
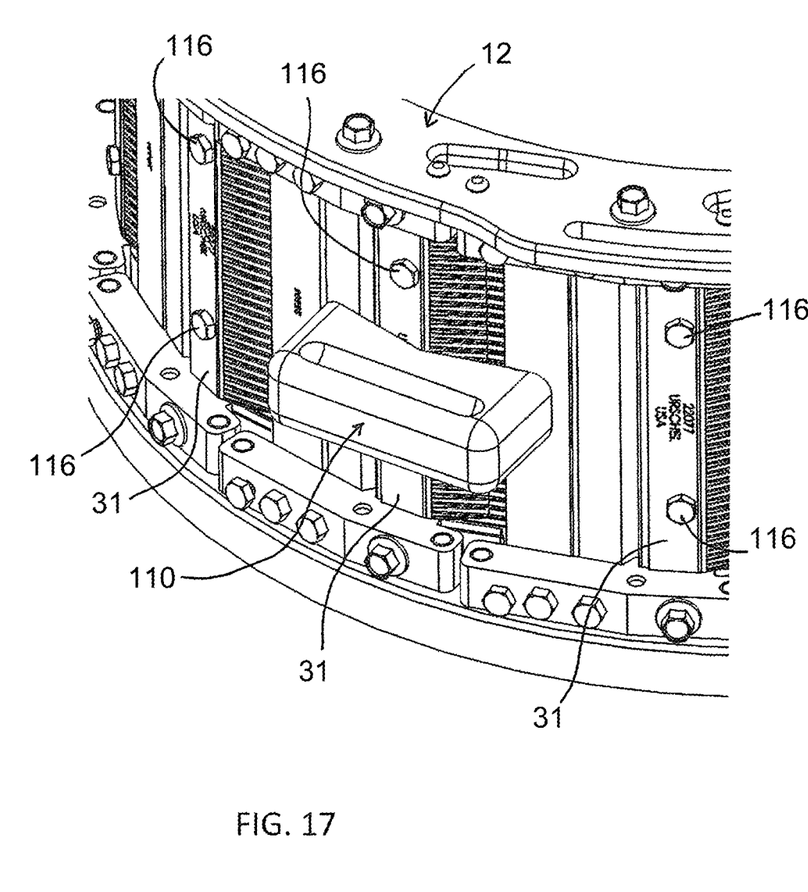
FIG. 17 represents the tool of FIG. 16 in use when installing or removing of a knife from a cutting head whose knives are secured with bolts.

FIGS. 16 and 17 represent an additional but optional tool 110 for use in combination with the knife replacement tool 60 depicted in FIGS. 4 through 15. The tool 110 is shown in FIG. 17 as adapted to be used on the exterior of the cutting head 12, and therefore opposite the knife replacement tool 60 as viewed in FIG. 9. The tool 110 is equipped with at least one and preferably multiple magnets 112 disposed in a valley or concavity defined in a surface 114 of the tool 110. The magnets 112 are sufficiently powerful so that when the tool 110 is positioned on the cutting head 12 as seen in FIG. 17, the magnets 112 are able to magnetically secure the tool 110 to the cutting head 12 and draw the clamp 31 away from the knife holder 30 to facilitate installation of the knife 20 into the gap 120 between the clamp 31 and knife holder 30. For this purpose, one of the magnets 112 of the tool 110 shown in FIG. 16 is centrally located near the midpoint of the valley for attracting the knife clamp 31, and two of the magnets 112 are located near the outer extents of the tool surface 114 to magnetically secure the tool 110 to the cutting head 12. Instead of the quick-clamping assembly 28 of FIGS. 9 and 11 through 14, the cutting head 12 is represented in FIG. 17 as employing bolts 116 to secure the knives 20 and clamps 31 to their respective knife holders 30.

While the invention has been described in terms of specific or particular embodiments, it should be apparent that alternatives could be adopted by one skilled in the art. For example, the machine 10, cutting head 12, impeller 14, tools 60 and 110, and their respective components could differ in appearance and construction from the embodiments described herein and shown in the drawings, functions of certain components of the machine 10, cutting head 12, impeller 14, and/or tools 60 and 110 could be performed by components of different construction but capable of a similar (though not necessarily equivalent) function, and various materials could be used in the fabrication of the machine 10, cutting head 12, impeller 14, tools 60 and 110, and their respective components. In addition, the invention encompasses additional or alternative embodiments in which one or more features or aspects of a particular embodiment could be eliminated or two or more features or aspects of different disclosed embodiments could be combined. Accordingly, it should be understood that the invention is not necessarily limited to any embodiment described herein or illustrated in the drawings. It should also be understood that the phraseology and terminology employed above are for the purpose of describing the illustrated embodiment, and do not necessarily serve as limitations to the scope of the invention. Therefore, the scope of the invention is to be limited only by the following claims.

The invention claimed is:

1. A method of installing a knife in a cutting unit of a machine using a knife replacement tool,
   the method comprising:
   releasing a clamping force that secures a knife clamp against a knife holder of a clamping assembly of the cutting unit to create a gap between the knife clamp and the knife holder;
   gripping the knife between a clamp and a knife support tab of a clamping body of the knife replacement tool;
   abutting the clamping body against the cutting unit immediately adjacent the clamping assembly;
   moving the knife replacement tool toward the clamping assembly to fully install the knife in the gap between the knife clamp and the knife holder;
   operating the clamping assembly to clamp the knife between the knife clamp and the knife holder; and
   disengaging the clamp of the clamping body from the knife.

2. The method of claim 1,
   wherein the cutting unit is an annular-shaped cutting head of a slicing machine.

3. The method of claim 1,
   the method further comprising maintaining the clamping body of the knife replacement tool against the cutting unit with at least one magnet in a lower surface of a base of the clamping body.

4. The method of claim 1,
   the method further comprising inserting the knife support tab in a groove in the cutting unit to help locate the knife replacement tool relative to the cutting unit.

5. The method of claim 1,
   the method further comprising inserting a portion of the cutting unit in a slot in a lower surface of a base of the clamping body to help locate the knife replacement tool relative to the cutting unit.

* * * * *